US012803994B2

(12) United States Patent
Tatti et al.

(10) Patent No.: US 12,803,994 B2
(45) Date of Patent: Nov. 17, 2026

(54) AUTOMATED BOT AND WEAPONIZATION ACTIVITY DETECTION AND MITIGATION

(71) Applicant: INTUIT INC., Mountain, CA (US)

(72) Inventors: Abhishek Tatti, Mountain View, CA (US); Luiza Nacshon, Tel Aviv (IL); Claire De Saint Phalle, Mountain View, CA (US); Marshall J. Vanderhoof, Mountain View, CA (US); Jason Dee Troy Marley, Mountain View, CA (US); Scott Cruickshanks Kennedy, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 28 days.

(21) Appl. No.: 19/043,051

(22) Filed: Jan. 31, 2025

(65) Prior Publication Data

US 2026/0230481 A1 Aug. 6, 2026

(51) Int. Cl.
*H04L 9/40* (2022.01)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 9,483,742 B1 * 11/2016 Ahmed ............... H04L 63/1441
11,257,486 B2 * 2/2022 Medalion ................ G06F 40/30
11,688,393 B2 * 6/2023 Medalion ............ G10L 15/1815 704/232
11,861,003 B1 * 1/2024 Imani Hossein Abad .................. G06F 21/554
2021/0185057 A1 * 6/2021 McLean .............. H04L 63/1416
2021/0272559 A1 * 9/2021 Medalion ............... G06N 20/00
2022/0172712 A1 * 6/2022 Medalion ............. G06N 3/0499
2023/0171276 A1 * 6/2023 Bisht .................. H04L 63/1441 726/23
2024/0037231 A1 * 2/2024 Jia ......................... G06F 21/566

OTHER PUBLICATIONS

Wang et al. (BotCluster: A session-based P2P botnet clustering system on NetFlow, Computer Networks 145 (2018) 175â189) (Year: 2018).*

* cited by examiner

*Primary Examiner* — Oleg Korsak
(74) *Attorney, Agent, or Firm* — DLA PIPER LLP US

(57) ABSTRACT

At least one processor may receive network traffic data and group at least a portion of the network traffic data into at least one session according to time correlation of activity by a network entity. The at least one processor may extract a plurality of features indicative of malicious network activity from the at least one session and/or determine at least one entropy feature of the at least one session. The at least one processor may classify the plurality of features and/or the at least one entropy feature with a clustering machine learning (ML) model. In response to the classifying indicating that the at least one session included malicious activity and/or activity corresponding to at least one of a plurality of bot classifications, the at least one processor may block at least a portion of ongoing network traffic from the network entity from reaching at least one destination.

17 Claims, 11 Drawing Sheets

400

800

1000

AUTOMATED BOT AND WEAPONIZATION ACTIVITY DETECTION AND MITIGATION

BACKGROUND

Malicious cyber attacks often use bots and/or other advanced and sophisticated cyber weapons. Bot activity can be hard to detect due to adversarial use of user-agent strings and/or other obfuscation techniques to mislead and deceive detection systems. In some cases, adversaries build custom cyber weapons to exploit targets and pose a significant risk for web attack surfaces, products, and customers. Malicious groups may have extensive knowledge of the software, web service, and/or information technology (IT) infrastructure they target and operate with stealth and precision. They are adept at identifying vulnerabilities and exploiting them to penetrate and compromise target systems, exfiltrate valuable data, disrupt critical operations, and monetize their attacks.

BRIEF DESCRIPTIONS OF THE DRAWINGS

DETAILED DESCRIPTION OF SEVERAL EMBODIMENTS

Systems and methods described herein can identify bot activity within web traffic and/or can identify and categorize weaponization and/or threat activity in web traffic. Once malicious traffic has been identified, systems and methods describe herein can protect other network components from being harmed by the malicious traffic.

In at least some embodiments, identifying bot activity can include analyzing session-level features such as request patterns, content interaction, and specific behaviors associated with bots, for example. The session-level features may be used to calculate a "bot score," which, when exceeding a predefined threshold, may trigger the disclosed embodiments to flag the session for potential bot activity. At least some embodiments may incorporate a modified unsupervised clustering approach to categorize identified bots, which may help provide understanding of their nature and purpose.

In at least some embodiments, processing can include identifying and/or categorizing threat actor groups early in the weaponization lifecycle with high accuracy, efficiency, and agility. Unlike solutions that identify weaponization activity based solely on static features identified by the WAF (Wireless Application Firewall), disclosed embodiments may be fast, efficient, and thorough, avoiding problems where critical information may be missed during the weaponization lifecycle due to WAF requiring rigid rules that an adversary may modify their attack to circumvent. For example, disclosed embodiments may dynamically categorize adversarial activity throughout the weaponization lifecycle using automated techniques. At least some embodiments may analyze data such as request headers, uniform resource indicators (URIs), and/or associated tags to extract patterns indicative of malicious activity. The extracted features may be used to train a machine learning (ML) model to classify requests as benign or potentially malicious. Additionally, an entropy-weighted distance metric may be introduced to refine clustering algorithms like K-Means or Random-forest, placing greater emphasis on entropy when determining session similarity. In some embodiments the extracted features, such as entropy-based features, can be used to train a machine learning classifier to identify potentially malicious sessions. By combining pattern-based features, statistical features, and entropy-based features, disclosed embodiments may provide robust detection of stealthy threat actors, even in the presence of highly skilled attack techniques.

Figure 1:
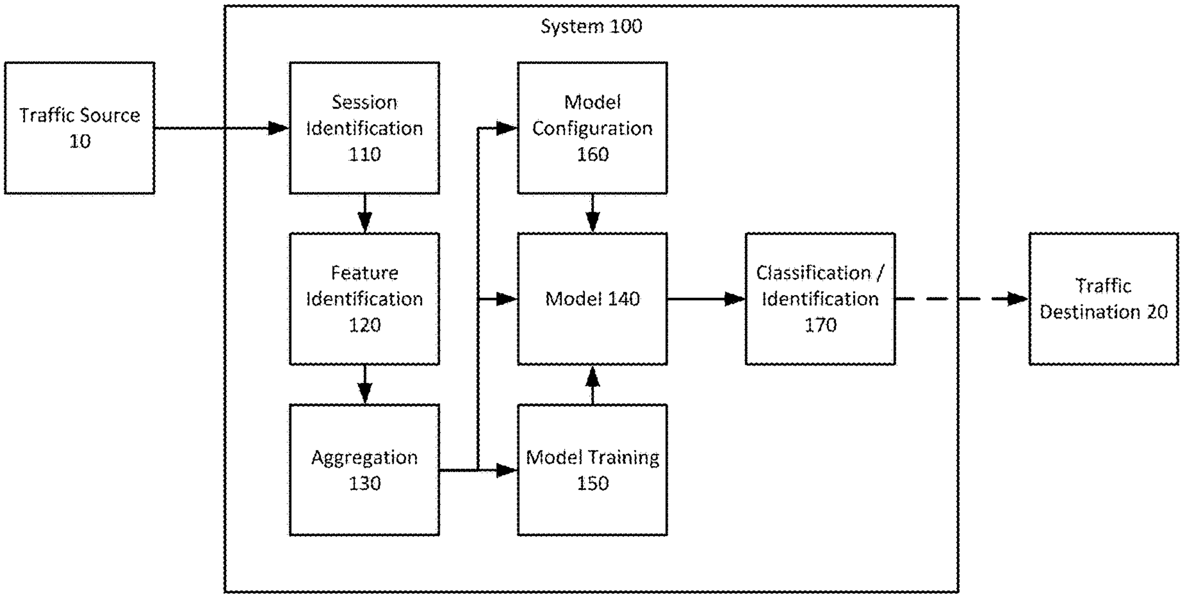
FIG. 1 shows an example automated bot and weaponization activity detection and mitigation system according to some embodiments of the disclosure.

FIG. 1 shows an example automated bot and weaponization activity detection and mitigation system 100 according to some embodiments of the disclosure. System 100 may include one or more modules such as session identification 110, feature identification 120, aggregation 130, model 140 (e.g., which may include one or more ML models), model training 150, model configuration 160, and/or classification/identification 170, the features and functions of which are described in detail below. As described in detail below, system 100 may receive and process traffic from traffic source 10 to determine whether to allow the traffic to proceed to traffic destination 20 and/or otherwise identify malicious activity, for example.

Illustrated components may include a variety of hardware, firmware, and/or software components that interact with one another. Some components shown in FIG. 1 may communicate with one another using networks. For example, system 100 may receive traffic from traffic source 10 through one or more networks (e.g., the Internet, an intranet, and/or one or more networks that provide a cloud environment) and/or may block the traffic from proceeding to traffic destination 20 on the one or more networks. In some embodiments, elements of system 100 may communicate with one another through the one or more networks. Each component may be implemented by one or more computers (e.g., as described below with respect to FIG. 11).

The elements of system 100 are described in greater detail below with respect to FIGS. 2-10, but in general, system 100 can monitor network traffic, which may come from network source 10 (in practice, system 100 may monitor traffic from multiple, not necessarily predictable, network sources 10, but one is shown for clarity). Session identification 110 may identify discrete activity session(s) for traffic source 10, feature detection 120 may identify and/or derive features for a session, and aggregation 130 may aggregate some or all features. The resulting data may be used by model training 150 to train model 140, by model configuration 160 to configure model 140, and/or by model 140 itself to identify malicious activity. Model 140 outputs may be used by classification/identification 170 to determine whether network traffic is malicious and, if so, block the network traffic from reaching traffic destination 20.

Elements illustrated in FIG. 1 (e.g., system 100 (including session identification 110, feature identification 120, aggregation 130, model 140, model training 150, model configuration 160, and classification/identification 170), traffic source 10, and traffic destination 20) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one session identification 110, one feature identification 120, one aggregation 130, one model 140, one model training 150, one model configuration 160, and one classification/identification 170 are illustrated, this is for clarity only, and multiples of any of the above elements may be present. In practice, there may be single instances or multiples of any of the illustrated elements, and/or these elements may be combined or co-located. For example, system 100 may receive traffic from multiple traffic sources 10 and/or intended for multiple traffic destinations 20.

In the following descriptions of how the illustrated components function, several examples are presented. However, those of ordinary skill in the art will appreciate that these examples are merely for illustration, and the disclosed embodiments are extendable to other application and data contexts.

Figure 2:
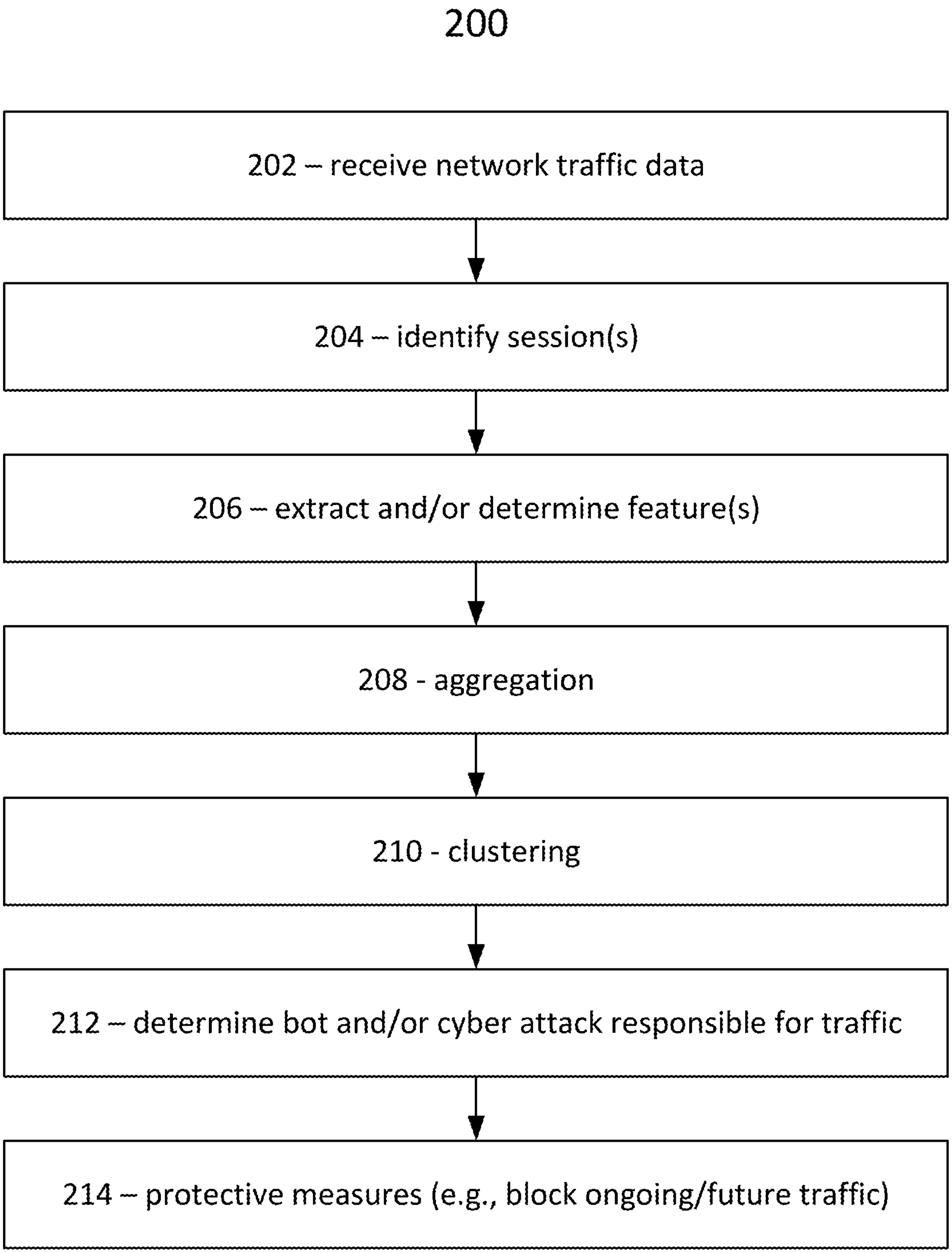
FIG. 2 shows an example automated bot and weaponization activity detection and mitigation process according to some embodiments of the disclosure.

FIG. 2 shows an example automated bot and weaponization activity detection and mitigation process 200 according to some embodiments of the disclosure. FIG. 2 shows an example of a general process 200 whereby system 100 can identify malicious network traffic and prevent it from reaching traffic destination 20. FIG. 2 generalizes automated bot and weaponization activity detection and mitigation to explain an overall flow for any network traffic handled by system 100, and subsequent figures provide more specific implementations in greater detail.

At 202, system 100 can receive network traffic data. System 100 can collect or obtain network traffic by any known or proprietary technique. In some embodiments, system 100 can be part of a network node through which network traffic passes and may process the network traffic passing through the node, for example. In some embodiments, system 100 may be deployed to analyze historical network traffic data collected over time, and may receive historical network traffic data gathered over some time period of interest. In any event, system 100 can receive the network traffic data and continue processing as follows.

At 204, system 100 can identify one or more sessions within the network traffic data. For example, system 100 can group requests within the network traffic data according to identifiers of respective traffic sources 10, such as IP addresses or other identifiers visible within the network traffic data. For each traffic source 10, system 100 can identify sessions according to time intervals. For example, requests that are correlated in time may be part of a same session. As described in detail below, system 100 can identify time intervals between subsequent requests that are longer than a threshold time, and break the traffic from traffic source 10 into sessions at these identified time intervals, for example.

At 206, system 100 can extract and/or determine features of at least one session identified at 204. A variety of features within the network traffic data may serve as indicators of suspicious activity, enabling detection of bot and/or weaponization activity through further processing by system 100. System 100 may extract features from the traffic data and/or derive features from the traffic data. In some embodiments, this may include extracting and/or deriving entropy features. Specific techniques and examples of features and how they may be extracted and/or determined are described in detail below, and features may vary according to embodiment and/or use case.

At 208, system 100 can aggregate features obtained at 206. Some features may be indicative of malicious activity in themselves, while others may become indicative of malicious activity after aggregation. In cases where aggregation can provide additional information, system 100 can perform aggregation. Specific examples and/or techniques for aggregation of features are described in detail below.

At 210, system 100 can perform ML clustering of features obtained and/or derived at 206 and/or 208. In some embodiments, system 100 can use a modified ML model to detect bot activity. Examples of how to modify an ML model and how to use the modified ML model to detect bot activity are described in detail below. In some embodiments, system 100 can use an ML model which may have customized weighting and/or training to detect weaponization. Examples of how to configure and/or train an ML model and use the ML model to detect weaponization are described in detail below. These use cases are not necessarily exclusive, and some embodiments may use both types of ML models to detect both types of activity.

At 212, system 100 can determine whether a bot and/or other cyber attacker is responsible for any of the network traffic of the one or more sessions. For example, based on the outcome of ML model processing at 210, system 100 can make a determination that traffic from traffic source 10 is malicious or benign.

At 214, in response to identifying malicious traffic at 212, system 100 can provide protective measures to traffic destination 20. If traffic is benign, it may continue on to traffic destination 20. However, if the traffic from traffic source 10 is malicious as determined at 212, system 100 can employ any known or proprietary technique to prevent the malicious traffic from reaching traffic destination 20. For example, ongoing requests from traffic source 10 may have packets dropped or may be quarantined, and/or traffic source 10 may be blacklisted or otherwise restricted from having its traffic delivered to traffic destination 20.

Figure 3:
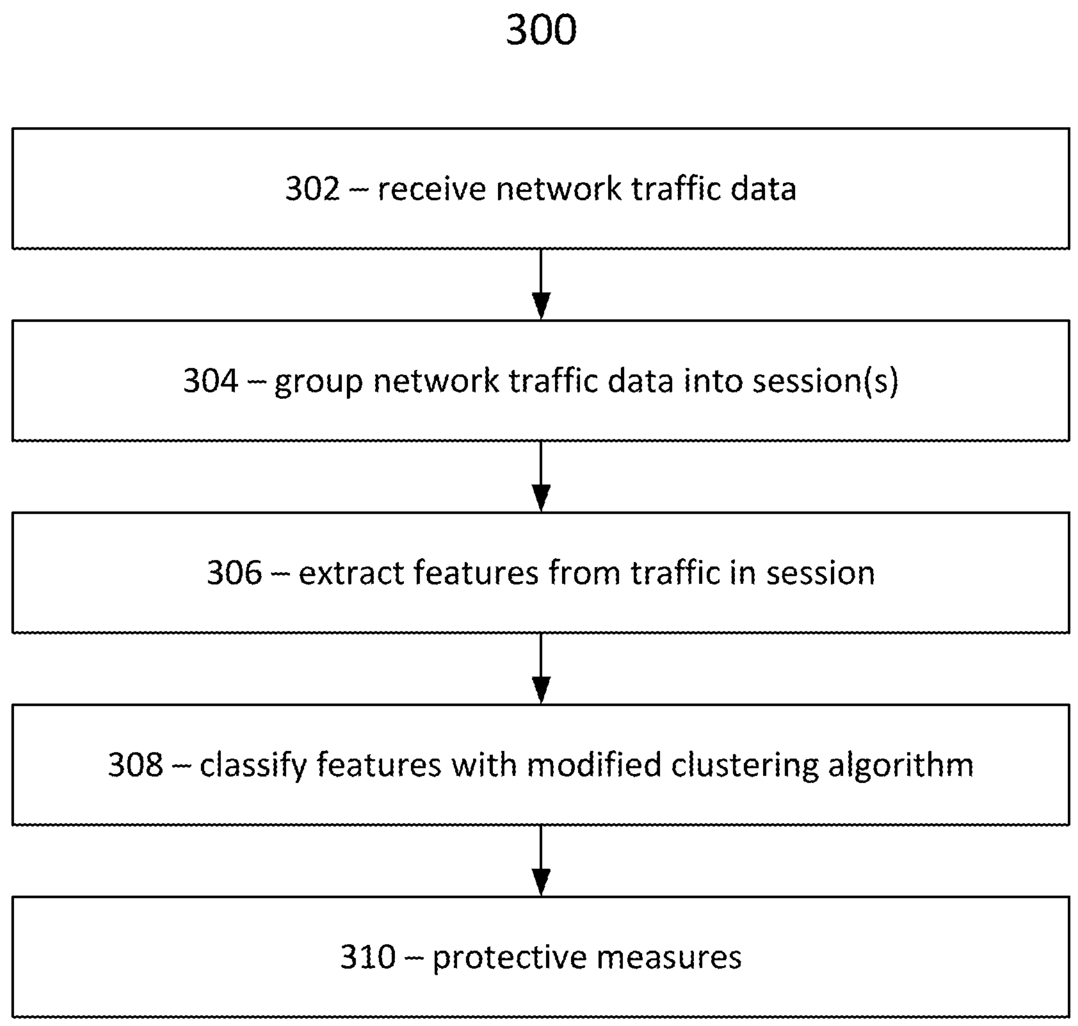
FIG. 3 shows an example automated bot detection and mitigation process according to some embodiments of the disclosure.

FIG. 3 shows an example automated bot detection and mitigation process 300 according to some embodiments of the disclosure. Process 300 of FIG. 3 may be a specific embodiment of process 200 or a stand-alone process, wherein system 100 may process network traffic data to identify and defend against malicious bot activity.

At 302, system 100 may receive network traffic data. System 100 can collect or obtain network traffic by any known or proprietary technique. In some embodiments, system 100 can be part of a network node through which network traffic passes and may process the network traffic passing through the node, for example. In some embodiments, system 100 may be deployed to analyze historical network traffic data collected over time, and may receive historical network traffic data gathered over some time period of interest. In any event, system 100 can receive the network traffic data and continue processing as follows.

At 304, system 100 may group the network traffic data received at 302 into one or more sessions. For example, session identification 110 may group at least a portion of the network traffic data into at least one session according to time correlation of activity by a network entity.

Figure 4:
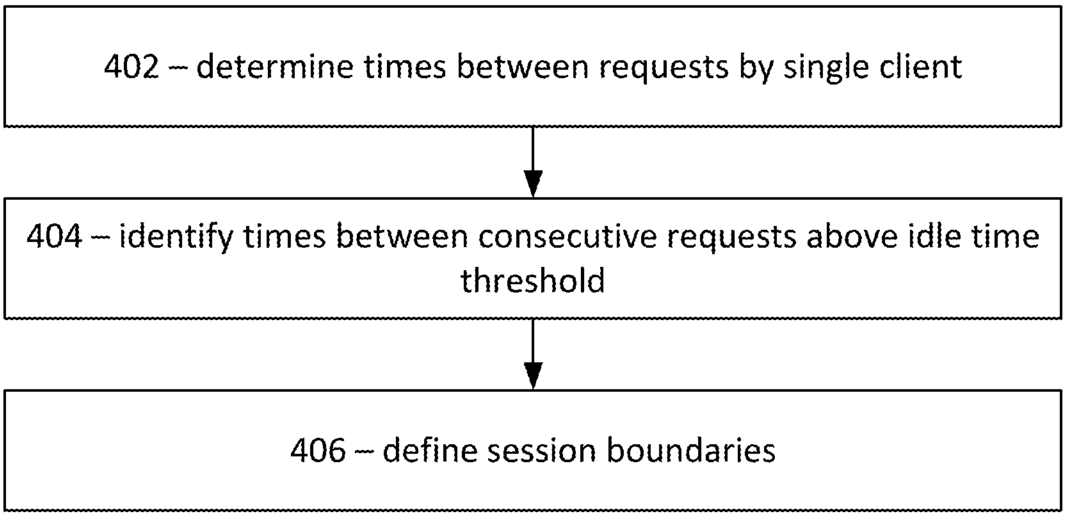
FIG. 4 shows an example session determination process according to some embodiments of the disclosure.

FIG. 4 shows an example session determination process 400 that may be performed by session identification 110 at 304 according to some embodiments of the disclosure. As used herein, a session may include a sequence of interactions (e.g., requests) by a single traffic source 10 (e.g., identified by IP address or other identifying data within network traffic) within a defined time window. By performing process 400, session identification 110 may isolate one or more sessions for further processing within process 300.

At 402, session identification 110 may determine times between requests by a single client (e.g., a single traffic source 10). For example, the traffic data may include records of all requests by traffic source 10 or multiple traffic sources 10. If records for multiple traffic sources 10 are included, session identification 110 may isolate all records for a single traffic source 10 according to traffic source 10 identifier such as IP address (e.g., through filtering out other IP addresses, grouping requests from different IP addresses and processing one grouping at a time, etc.). Each request record may include a time stamp or other timing data indicating when the request was made and/or sent. Session identification 110 may order the requests by time and determine intervals between subsequent requests. Accordingly, session identification 110 can select a subset of network traffic sent as requests by the network entity of interest (e.g., traffic source 10) and calculate time differences between consecutive requests, At 404, session identification 110 may identify times between consecutive requests that are above an idle time threshold. To determine session boundaries where a session begins and where a session ends, session identification 110 may set an idle time threshold. Any idle time threshold may be used, but for example, session identification 110 may set an idle time threshold of five minutes. Accordingly, session identification 110 may identify where, in the timeline of network traffic, consecutive requests by traffic source 10 were more than five minutes apart.

At 406, session identification 110 may define session boundaries. A session may start after consecutive requests separated by a time above the idle time threshold and may end before the next consecutive requests separated by a time above the idle time threshold. For example, session identification 110 may determine at least one session start as a second one of a first pair of consecutive requests having a time difference above an idle time threshold, and session identification 110 may determine at least one session end as a first one of a second pair of consecutive requests having a time difference above the idle time threshold. Thus, session identification 110 may form the at least one session to include all requests by the network entity (e.g., traffic source 10) occurring after the first one of the first pair of consecutive requests and before the second one of the second pair of consecutive requests.

To summarize, in at least some embodiments, session identification 110 may first sort requests by client IP and timestamp. Then, session identification 110 may iterate through requests, calculating the time difference between consecutive requests from the same IP. Finally, if a time difference exceeds the idle time threshold, session identification 110 may mark the end of the current session and the start of a new one.

Returning to FIG. 3, at 306, system 100 may extract features from the traffic in a session. For example, feature identification 120 may extract a plurality of features indicative of malicious network activity from the at least one session. In at least some embodiments, aggregation 130 may aggregate one or more of the features into one or more aggregated features.

Figure 5:
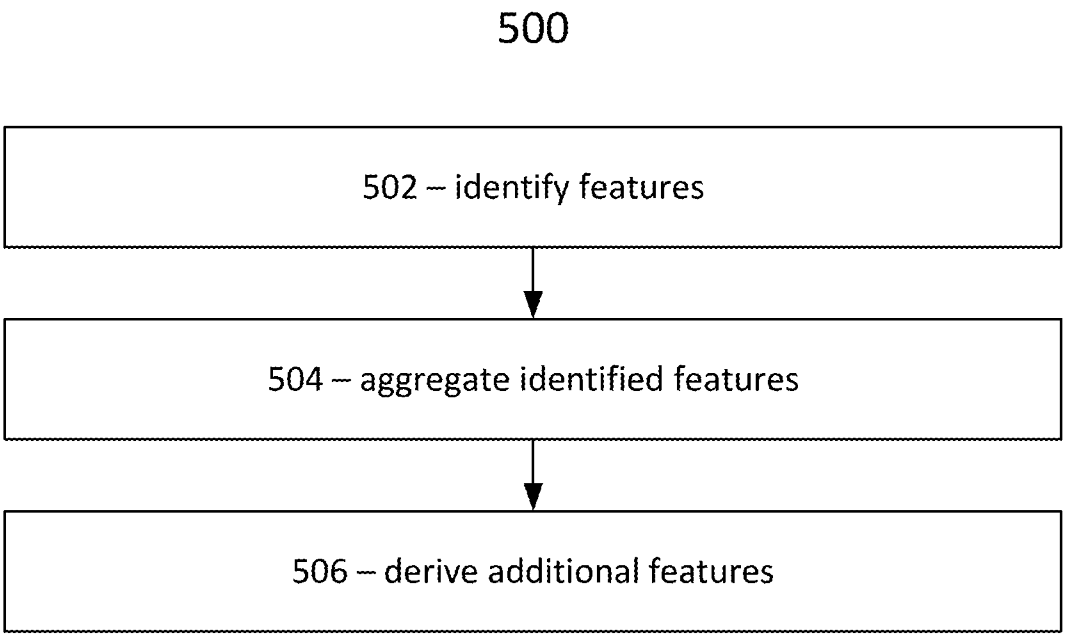
FIG. 5 shows an example feature determination process according to some embodiments of the disclosure.

FIG. 5 shows an example feature determination process 500 that may be performed by feature identification 120 at 306 according to some embodiments of the disclosure. By performing process 500, feature identification 120 may extract and/or derive one or more features from a session determined at 304. These features may be used to classify network activity in subsequent portions of process 300, for example.

At 502, feature identification 120 may identify one or more features. Feature identification 120 may use any known or proprietary technique to extract features from request records within a session, such as extracting by data category, performing keyword searching, etc. For example, feature identification may extract request-level features describing request timing, frequency, size, etc.; content-specific features describing contents of requests; and/or time-related features describing timing of sessions and/or requests. Specific features that may be analyzed can vary from one embodiment to another, and may be selected according to a variety of design considerations.

At 504, feature identification 120 may aggregate one or more identified features. For at least some features, it may be more meaningful to use an aggregation of multiple factors and/or data points for further analysis than to use discrete factors and/or data points. In some cases, both discrete and aggregate data may be useful. Accordingly, feature identification 120 may aggregate one or more identified features within the session by summing, averaging, or otherwise combining them. Specific features that may be aggregated can vary from one embodiment to another, and may be selected according to a variety of design considerations.

At 506, feature identification 120 may derive one or more additional features. For example, feature identification 120 may perform processing using one or more of the features identified within 502 and/or one or more of the features aggregated at 504. Processing can include inserting the features into one or more equations to calculate other features, such as determining ratios of separate features or percentages of some features relative to others, etc. Specific features that may be derived can vary from one embodiment to another, and may be selected according to a variety of design considerations.

Returning to FIG. 3, at 308, system 100 may classify the features from 306 with a modified clustering ML algorithm. For example, model 140 may classify the plurality of features. Model 140 may include a clustering ML model including a plurality of predefined clusters each respectively indicating a respective one of a plurality of bot classifications. In the following example, system 100 uses a modified K-means clustering algorithm. However, other embodiments may use other clustering algorithms with modifications taking into account factors such as those described in detail below.

Figure 6:
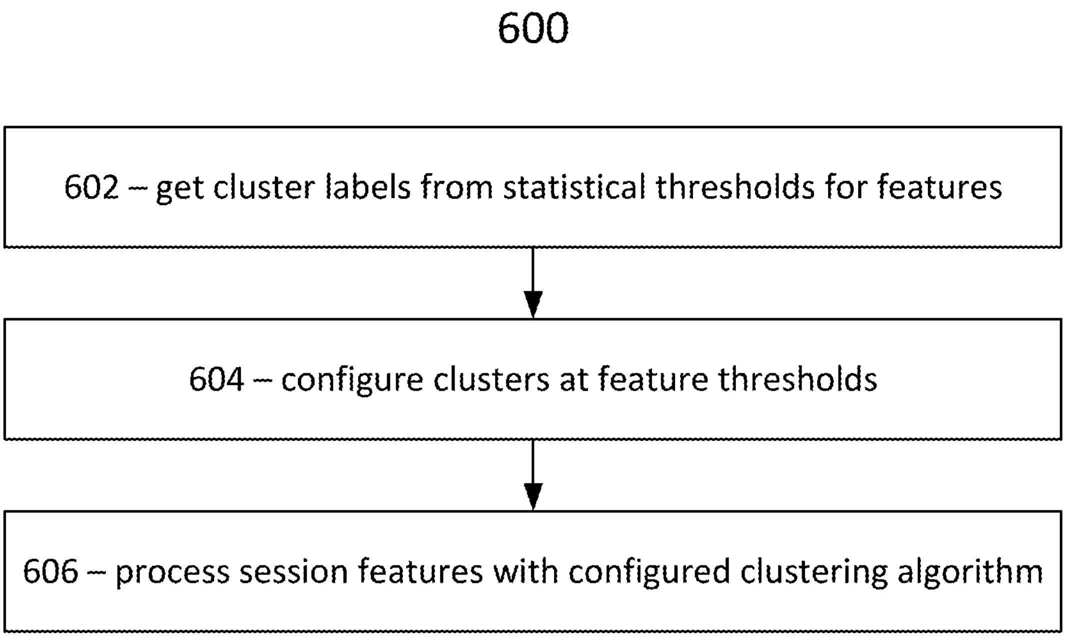
FIG. 6 shows an example bot detection process according to some embodiments of the disclosure.

FIG. 6 shows an example bot detection process 600 that may be performed by one or more of model 140, model training 150, and/or model configuration 160 at 308 according to some embodiments of the disclosure. By performing process 600, system 100 can detect bot activity in sessions, for example.

At 602, model configuration 160 may get cluster labels from statistical thresholds for features. For example, instead of using default K-means cluster assignments, model configuration 160 may label each cluster based on the dominant characteristics of its member to automatically define a plurality of predefined clusters that may then be used by model 140 for analysis. Automatically defining the plurality of predefined clusters may include automatically generating a respective label for each respective one of the plurality of predefined clusters according to a plurality of thresholds for the plurality of features. The thresholds may be statistically defined for various features such that, for example, features having a given value above or below a threshold may be indicative of a bot type. High (or low) frequency of a specific feature may indicate a specific bot type (e.g., malicious activity, bot, scraping bot, image scraping bot, probing bot, high data transfer bot, brute force bot, etc.). Specific thresholds and/or labels can vary from one embodiment to another, and may be selected according to a variety of design considerations.

At 604, model configuration 160 may configure model 140 clusters at feature thresholds. This can include, for example, initializing the clustering ML model 140 with respective ones of the plurality of predefined clusters positioned according to respective locations of a plurality of thresholds for the plurality of features. This may guide the clustering process to converge towards groups that align with predefined bot types.

At 606, model 140 may process session features with the configured clustering algorithm. For example, model 140 may receive the data generated at 306 and may assign each data point (e.g., session) to a nearest centroid based on feature similarity. Model 140 may recalculate centroids based on the newly assigned data points. Model 140 may repeat the assigning and recalculating until the centroids stabilize or a maximum number of iterations is reached.

The following is a specific example of how K-means may be modified for processing at 606, although other modifications may be possible in other embodiments. A basic K-means formula may be as follows:

$$WCSS=\Sigma\Sigma\ \|x-\mu i\|^2$$

where x is a data point (session feature vector), μi is the centroid of cluster i, the outer summation is over all clusters, and the inner summation is over all data points in a cluster.

The modified K-means formula may be as follows:

$$J(C,\ \mu,\ L)=WCSS(C,\ \mu)+\alpha * L(C,\ L^*)$$

where C={C1,C2, . . . , CK} is the set of clusters, μ={μ1,μ2, . . . , μK} is the set of cluster centroids, L={I1, I2, . . . , IK} is the set of assigned cluster labels, L*={I1*, I2*, . . . , IK*} is the set of target labels based on feature thresholds, and α is a weighting factor to balance the importance of WCSS and label agreement.

Model configuration 160 may initialize cluster centroids based on the target labels L* using feature thresholds. During iteration, model 140 may assign each data point to the nearest centroid, recalculate centroids as the mean of the data points in each cluster, assign labels to each cluster based on the feature thresholds, and if the centroids or labels have not changed significantly, stop. Otherwise, model 140 may continue to the next iteration.

The modified K-means may include the K-means basic formulas with additional calculations as follows:

WCSS(C, μ) can measure the compactness of the clusters, just like in standard K-means.

L(C, L*) =Σ I(I_i ≠I^*_i) can penalize the algorithm if the assigned labels li for each cluster Ci do not match the target labels Ii* derived from the feature thresholds, where I is an indicator function that equals 1 if the labels are different and 0 otherwise.

Classification/identification 170 may determine that the classifying indicates that the at least one session included activity corresponding to at least one of the plurality of bot classifications. For example, classification/identification 170 may identify sessions that stabilize in a centroid labeled as a malicious bot centroid represent bot activity. Accordingly, in response to the classifying, at 310, system 100 may block at least a portion of ongoing network traffic from the network entity (e.g., traffic source 10) from reaching at least one destination (e.g., traffic destination 20), using known or proprietary methods.

By performing process 300, system 100 may provide session aware analysis wherein by defining sessions based on idle time, system 100 can capture bot behavior more accurately than simply looking at individual requests. The inclusion of content-specific and time-related features may provide a richer representation of bot activity. By using statistically determined thresholds to perform data-driven labeling, system 100 may remove the need for manual labeling, making the process more objective and scalable. The strategic placement of initial centroids may improve the efficiency and accuracy of the clustering process, leading to more meaningful bot type classifications. The resulting clusters may be aligned with specific bot behaviors, making it easier to understand the nature and purpose of detected bots.

Figure 7:
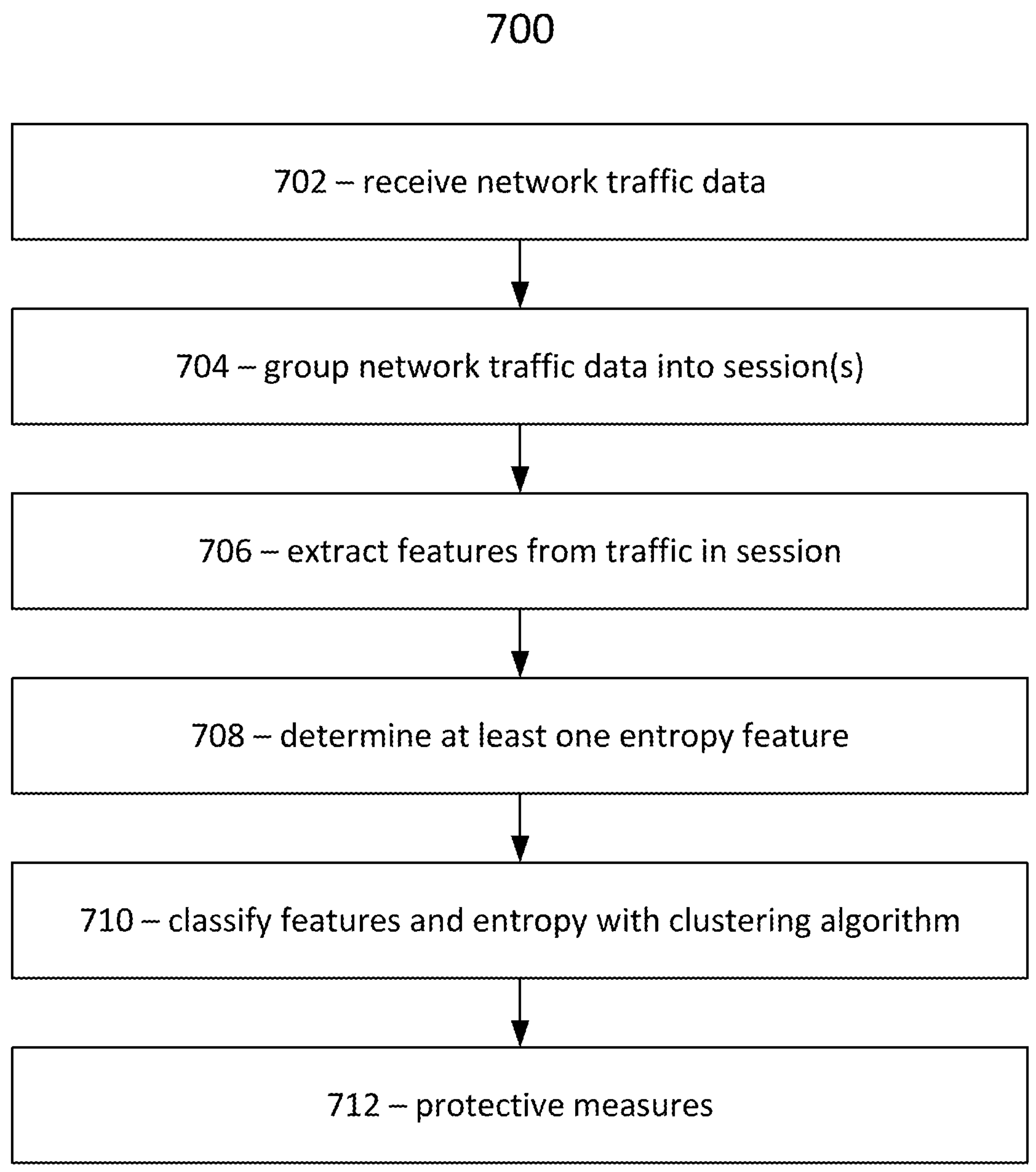
FIG. 7 shows an example automated weaponization activity detection and mitigation process according to some embodiments of the disclosure.

FIG. 7 shows an example automated weaponization activity detection and mitigation process 700 according to some embodiments of the disclosure. Process 700 of FIG. 7 may be a specific embodiment of process 200 or a stand-alone process, wherein system 100 may process network traffic data to identify and defend against weaponized network activity.

At 702, system 100 may receive network traffic data. System 100 can collect or obtain network traffic by any known or proprietary technique. In some embodiments, system 100 can be part of a network node through which network traffic passes and may process the network traffic passing through the node, for example. In some embodiments, system 100 may be deployed to analyze historical network traffic data collected over time, and may receive historical network traffic data gathered over some time period of interest. In any event, system 100 can receive the network traffic data and continue processing as follows.

At 704, system 100 may group the network traffic data received at 302 into one or more sessions. For example, session identification 110 may group at least a portion of the network traffic data into at least one session according to time correlation of activity by a network entity.

Figure 8:
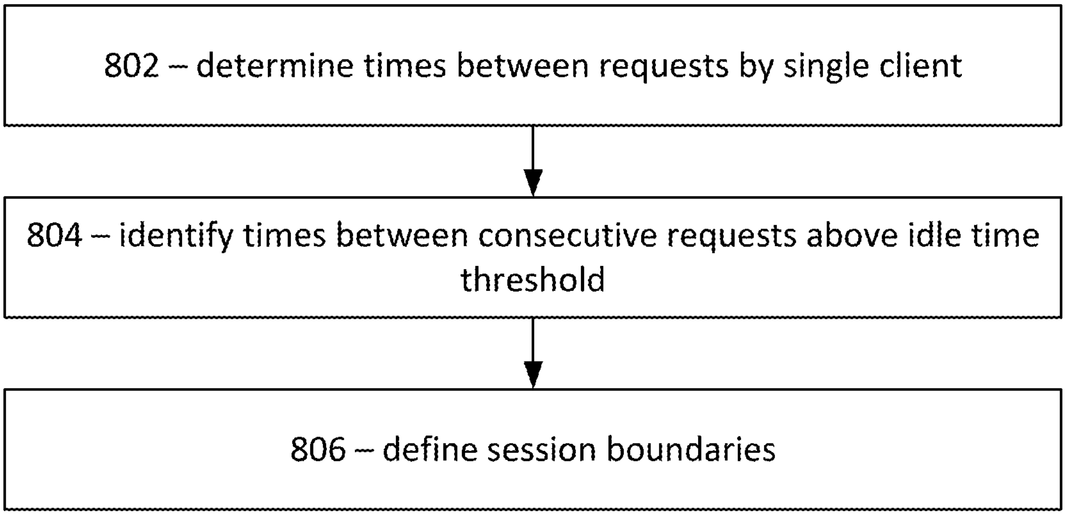
FIG. 8 shows an example session determination process according to some embodiments of the disclosure.

FIG. 8 shows an example session determination process 800 that may be performed by session identification 110 at 704 according to some embodiments of the disclosure. By performing process 800, session identification 110 may isolate one or more sessions for further processing within process 700.

At 802, session identification 110 may determine times between requests by a single client (e.g., a single traffic source 10). For example, the traffic data may include records of all requests by traffic source 10 or multiple traffic sources 10. If records for multiple traffic sources 10 are included, session identification 110 may isolate all records for a single traffic source 10 according to traffic source 10 identifier such as IP address (e.g., through filtering out other IP addresses, grouping requests from different IP addresses and processing one grouping at a time, etc.). Each request record may include a time stamp or other timing data indicating when the request was made and/or sent. Session identification 110 may order the requests by time and determine intervals between subsequent requests. Accordingly, session identification 110 can select a subset of network traffic sent as requests by the network entity of interest (e.g., traffic source 10) and calculate time differences between consecutive requests, At 804, session identification 110 may identify times between consecutive requests that are above an idle time threshold. To determine session boundaries where a session begins and where a session ends, session identification 110 may set an idle time threshold. Any idle time threshold may be used, but for example, session identification 110 may set an idle time threshold of five minutes. Accordingly, session identification 110 may identify where, in the timeline of network traffic, consecutive requests by traffic source 10 were more than five minutes apart.

At 806, session identification 110 may define session boundaries. A session may start after consecutive requests separated by a time above the idle time threshold and may end before the next consecutive requests separated by a time above the idle time threshold. For example, session identification 110 may determine at least one session start as a second one of a first pair of consecutive requests having a time difference above an idle time threshold, and session identification 110 may determine at least one session end as a first one of a second pair of consecutive requests having a time difference above the idle time threshold. Thus, session identification 110 may form the at least one session to include all requests by the network entity (e.g., traffic source 10) occurring after the first one of the first pair of consecutive requests and before the second one of the second pair of consecutive requests.

To summarize, in at least some embodiments, session identification 110 may first sort requests by client IP and timestamp. Then, session identification 110 may iterate through requests, calculating the time difference between consecutive requests from the same IP. Finally, if a time difference exceeds the idle time threshold, session identification 110 may mark the end of the current session and the start of a new one.

Returning to FIG. 7, at 706, system 100 may extract features from the traffic in a session. For example, feature identification 120 may extract a plurality of features indicative of malicious network activity from the at least one session. At 708, system 100 may determine at least one entropy feature of the traffic in the session. For example, feature identification 120 may process the network activity to identify the at least one entropy feature. In at least some embodiments, aggregation 130 may aggregate one or more of the features and/or entropy features into one or more aggregated features.

Figure 9:
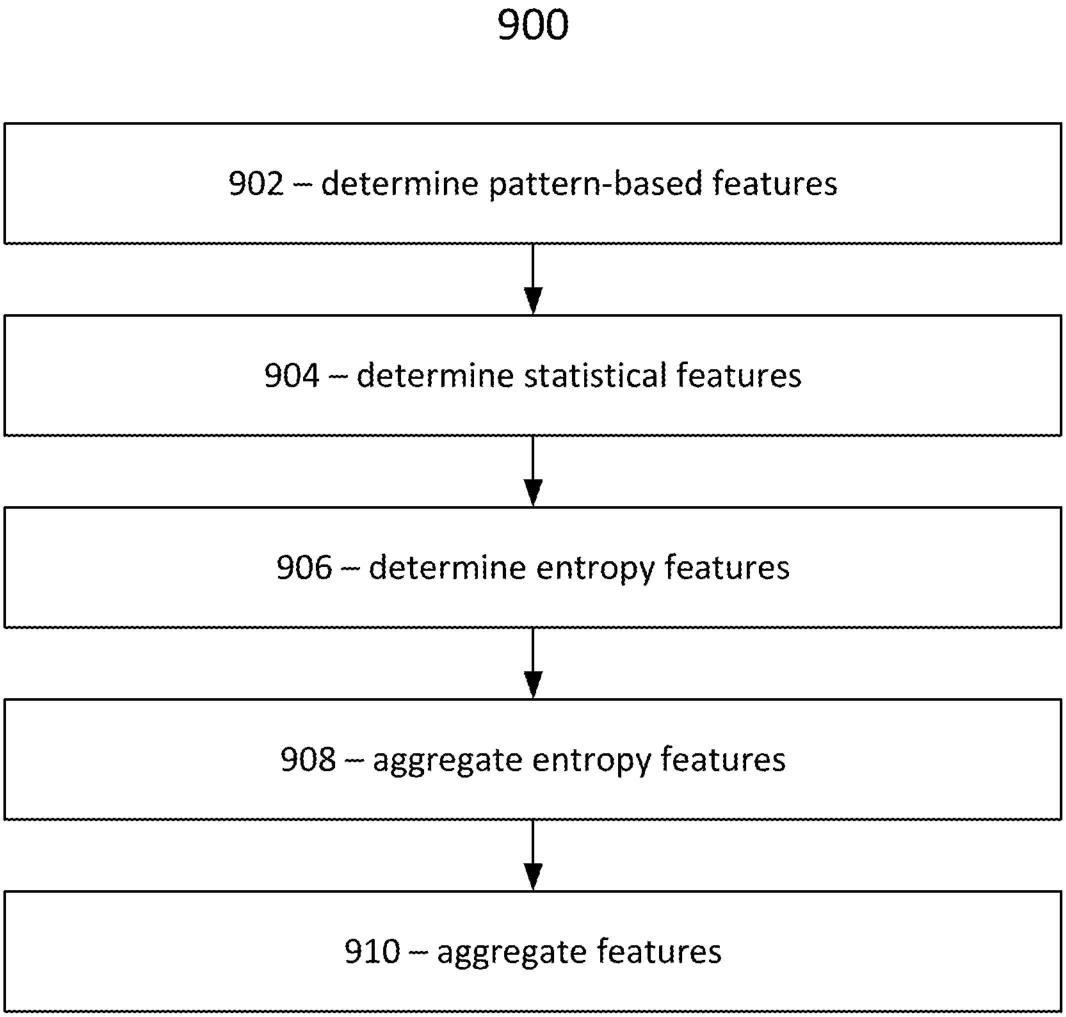
FIG. 9 shows an example feature determination process according to some embodiments of the disclosure.

FIG. 9 shows an example feature determination process 900 that may be performed by feature identification 120 at 706 and/or 708 according to some embodiments of the disclosure. By performing process 900, feature identification 120 may extract and/or derive one or more features from a session determined at 704. These features may be used to classify network activity in subsequent portions of process 700, for example.

At 902, feature identification 120 may determine one or more pattern-based features. For example, feature identification 120 may apply at least one regular expression to identify at least one of the plurality of features, which may identify potentially malicious patterns in request headers, URIs, tags, etc. In some cases, some patterns may be known to be associated with malicious activities, such as cross-site scripting (XSS), SQL injection (SQLi), command execution, and/or path traversal attacks, and regular expressions may be used to identify such patterns, for example. Specific features that may be analyzed can vary from one embodiment to another, and may be selected according to a variety of design considerations.

At 904, feature identification 120 may determine one or more statistical features. For example, feature identification 120 may use any known or proprietary technique to identify one or more statistical features related to request timing, frequency, count, ratio, size of request, size of request component(s), etc. Specific features that may be analyzed can vary from one embodiment to another, and may be selected according to a variety of design considerations.

At 906, feature identification 120 may determine one or more entropy features. For example, feature identification 120 may use any known or proprietary technique to calculate entropy for request headers, URIs, tags, and/or other request elements. Specific features that may be analyzed can vary from one embodiment to another, and may be selected according to a variety of design considerations.

At 908, feature identification 120 may aggregate entropy features determined at 906. For example, feature identification 120 may use any known or proprietary technique to calculate average entropy of requests, maximum request entropy, change in entropy over time, etc. Specific features that may be analyzed can vary from one embodiment to another, and may be selected according to a variety of design considerations.

At 910, feature identification 120 may aggregate one or more features determined at 902, 904, and/or 906, and/or aggregated entropy features generated at 908. For at least some features, it may be more meaningful to use an aggregation of multiple factors and/or data points for further analysis than to use discrete factors and/or data points. In some cases, both discrete and aggregate data may be useful. Accordingly, feature identification 120 may aggregate one or more identified features within the session by summing, averaging, or otherwise combining them. In at least some embodiments, feature identification 120 may combine the aggregated entropy features with the other statistical and pattern-based features to create a comprehensive feature vector for each session. Specific features that may be aggregated can vary from one embodiment to another, and may be selected according to a variety of design considerations.

Returning to FIG. 7, at 710, system 100 may classify the features from 706 and/or 708 with a clustering ML algorithm. For example, model 140 may classify the plurality of features and/or the at least one entropy feature. Model 140 may include a clustering ML model in at least some embodiments. In the following example, system 100 uses a K-means clustering algorithm. However, other embodiments may use other clustering algorithms with modifications taking into account factors such as those described in detail below.

Figure 10:
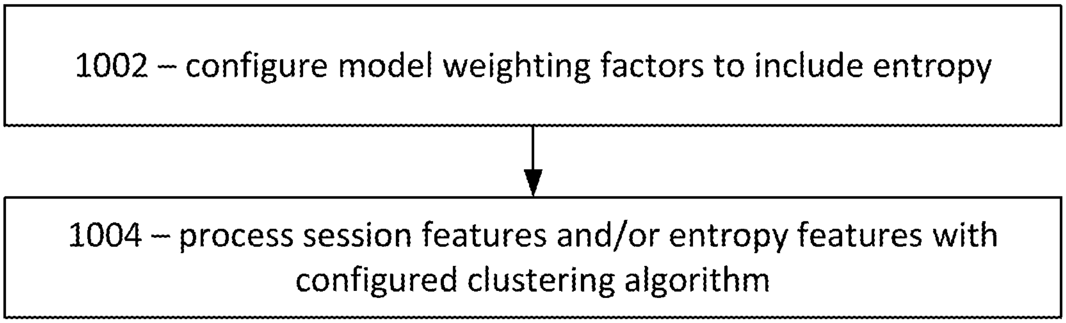
FIG. 10 shows an example weaponization activity detection process according to some embodiments of the disclosure.

FIG. 10 shows an example weaponization activity detection process 1000 that may be performed by one or more of model 140, model training 150, and/or model configuration 160 at 710 according to some embodiments of the disclosure. By performing process 1000, system 100 can detect cyber weapon activity in sessions, for example.

In at least some embodiments, prior to process 1000 being performed at runtime, model training 150 may train model 140 using at least one of the plurality of features and the at least one entropy feature generated in a prior iteration of feature determination process 900 as training data. For example, model training 150 may use one or more comprehensive feature vectors as produced at 910 of process 900 to train the clustering ML model.

At 1002, model configuration 160 may configure the clustering ML model (e.g., model 140) using at least one entropy feature as a weighting factor. For example, model configuration 160 may modify the standard Euclidean distance used in K-means by incorporating entropy as determined by process 900 as a weighting factor.

As an example to demonstrate how the at least one entropy feature as weighting factor can change classic K-means and/or random forest algorithms, consider the following two sessions. Session A may include many requests with low entropy (e.g., normal browsing behavior). Session B may include fewer requests with high entropy (e.g., potential obfuscated attack). Standard K-means and/or random forest algorithms might group these sessions together based on the number of requests. However, the entropy-weighted K-means may recognize the significant difference in entropy and place sessions A and B in separate clusters, accurately identifying session B as potentially malicious. By incorporating entropy into feature engineering and the distance metric, model configuration 160 may empower the clustering algorithm to better distinguish between benign and malicious sessions, leading to more effective detection of threat actors weaponizing a vulnerability of traffic destination 20.

At 1004, model 140 may process session features and/or entropy features with the configured clustering algorithm. For example, model 140 may receive the data generated at 706 and/or 708 and may cluster sessions using the modified weighting as described above. Model 140 may repeat calculations until the centroids stabilize or a maximum number of iterations is reached.

The following is a specific example of how K-means may be modified for processing at 1004, although other modifications may be possible in other embodiments.

Model configuration 160 may change the distance of a session to a cluster using the following formula for features engineering:

$$d(x,\ y)=\sqrt{[\Sigma\ \Omega\_j*(x\_j-y\_j)^2]}\text{–distance of point(session) to a cluster centroid}$$

where x represents the feature vector for one session (associated with one IP address); y represents the feature vector for another session (associated with a different IP address); for entropy-related features, model configuration 160 may set a higher weight (wj>1) to emphasize their importance in distinguishing between benign and malicious sessions; j is an index that represents each individual feature within the feature vectors x and y; xj and yj are the values of the $j$th feature for sessions x and y respectively; and • wj is the weight assigned to the $j$th feature.

In an example, the feature vectors may have four features for a session as follows:

$$x=(x1,x2,x3,x4)\text{–session 1 of IP 1;}$$

$$y=(y1,y2,y3,y4)\text{–session 2 of IP 2.}$$

The formula would be as follows:

$$d(x,\ y)=\sqrt{[\Omega\_1*(x\_1-y\_1)^2+\omega\_2*(x\_2-y\_2)^2+\Omega\_3*(x\_3\ -y\_3)^2+\Omega\_4*(x\_4-y\_4)^2]}$$

In this example, x1 represents the mean entropy of session x, y1 represents the mean entropy of session y, and w1 represents the weight assigned to the mean entropy feature (e.g., which may be set to be higher than 1 to emphasize its importance).

Clustering based on the entropy distance calculation may proceed by summing over all features (from j=1 to the total number of features) and calculating the overall distance between two sessions, taking into account the weighted contribution of each feature.

Classification/identification 170 may determine that the classifying indicates that the at least one session included activity corresponding to at least one of the weaponized activity classifications. For example, classification/identification 170 may identify features and entropies that suggest malicious activity rather than ordinary network activity. Accordingly, in response to the classifying, at 714, system 100 may block at least a portion of ongoing network traffic from the network entity (e.g., traffic source 10) from reaching at least one destination (e.g., traffic destination 20), using known or proprietary methods.

Figure 11:
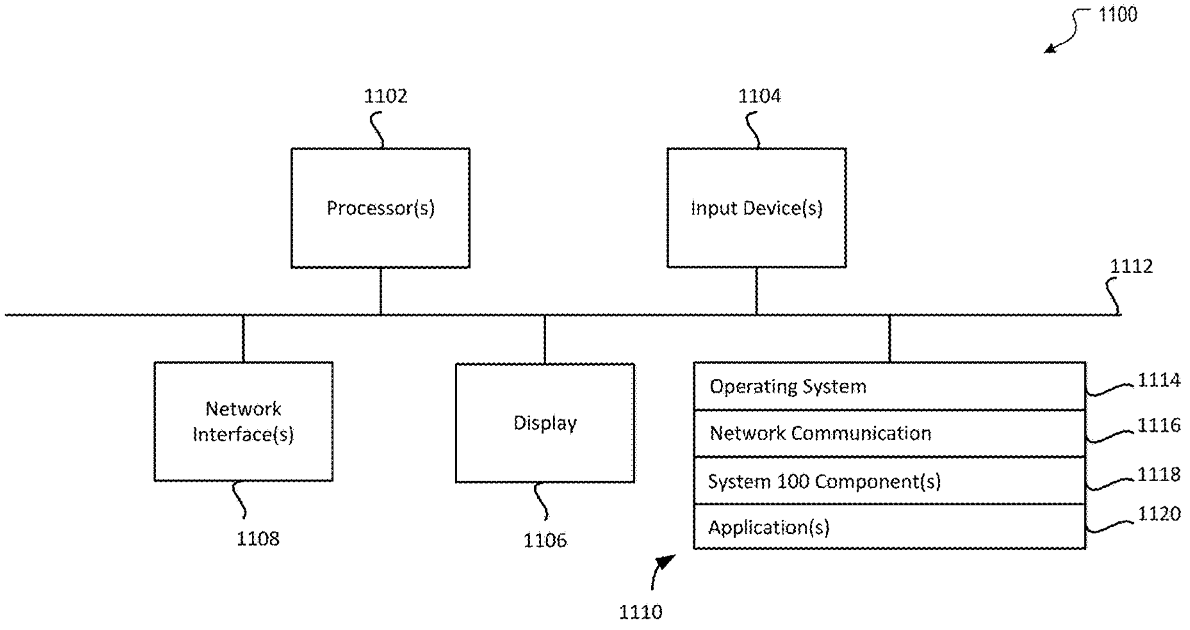
FIG. 11 shows an example computing device according to some embodiments of the disclosure.

FIG. 11 shows a computing device 1100 according to some embodiments of the disclosure. For example, computing device 1100 may function as system 100 and/or any portion(s) thereof, or multiple computing devices 1100 may function as system 100 and/or any portion(s) thereof.

Computing device 1100 may be implemented on any electronic device that runs software applications derived from compiled instructions, including without limitation personal computers, servers, smart phones, media players, electronic tablets, game consoles, email devices, etc. In some implementations, computing device 1100 may include one or more processors 1102, one or more input devices 1104, one or more display devices 1106, one or more network interfaces 1108, and one or more computer-readable mediums 1110. Each of these components may be coupled by bus 1112, and in some embodiments, these components may be distributed among multiple physical locations and coupled by a network.

Display device 1106 may be any known display technology, including but not limited to display devices using Liquid Crystal Display (LCD) or Light Emitting Diode (LED) technology. Processor(s) 1102 may use any known processor technology, including but not limited to graphics processors and multi-core processors. Input device 1104 may be any known input device technology, including but not limited to a keyboard (including a virtual keyboard), mouse, track ball, and touch-sensitive pad or display. Bus 1112 may be any known internal or external bus technology, including but not limited to ISA, EISA, PCI, PCI Express, NuBus, USB, Serial ATA or FireWire. In some embodiments, some or all devices shown as coupled by bus 1112 may not be coupled to one another by a physical bus, but by a network connection, for example. Computer-readable medium 1110 may be any medium that participates in providing instructions to processor(s) 1102 for execution, including without limitation, non-volatile storage media (e.g., optical disks, magnetic disks, flash drives, etc.), or volatile media (e.g., SDRAM, ROM, etc.).

Computer-readable medium 1110 may include various instructions 1114 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 may establish and maintain network connections (e.g., software for implementing communication protocols, such as TCP/IP, HTTP, Ethernet, telephony, etc.).

System 100 components 1118 may include instructions for performing the processing described herein. For example, system 100 components 1118 may provide instructions for performing any and/or all of processes 200-1000, and/or other processing as described above. Application(s) 1120 may be an application that uses or implements the outcome of processes described herein and/or other processes. In some embodiments, the various processes may also be implemented in operating system 1114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by at least one processor, network traffic data;

grouping, by the at least one processor, at least a portion of the network traffic data into at least one session according to time correlation of activity by a network entity;

extracting, by the at least one processor, a plurality of features indicative of malicious network activity from the at least one session;

determining, by the at least one processor, at least one entropy feature of the at least one session;

classifying, by the at least one processor, the plurality of features with a first clustering machine learning (ML) model including a plurality of predefined clusters each respectively indicating a respective one of a plurality of bot classifications, the classifying comprising initializing the first clustering ML model with respective ones of the plurality of predefined clusters positioned according to respective locations of a plurality of thresholds for the plurality of features, the classifying indicating that the at least one session included activity corresponding to at least one of the plurality of bot classifications;

classifying, by the at least one processor, the plurality of features and the at least one entropy feature with a second clustering ML model, the classifying indicating that the at least one session included malicious activity; and in response to at least one of the classifying with the first clustering ML model and the classifying with the second clustering ML model, blocking, by the at least one processor, at least a portion of ongoing network traffic from the network entity from reaching at least one destination.

2. The method of claim 1, wherein the grouping includes:

selecting a subset of network traffic sent as requests by the network entity;

calculating time differences between consecutive requests;

determining at least one session start as a second one of a first pair of consecutive requests having a time difference above an idle time threshold;

determining at least one session end as a first one of a second pair of consecutive requests having a time difference above the idle time threshold; and forming the at least one session to include all requests by the network entity occurring after the first one of the first pair of consecutive requests and before the second one of the second pair of consecutive requests.

3. The method of claim 1, wherein extracting the plurality of features includes extracting at least one request-level feature, extracting at least one content-specific feature, extracting at least one time-related feature, deriving at least one of the plurality of features from an aggregation of two or more of the plurality of features, applying at least one regular expression to identify at least one of the plurality of features, or a combination thereof.

4. The method of claim 1, further comprising automatically defining, by the at least one processor, the plurality of predefined clusters, wherein the automatically defining the plurality of predefined clusters comprises automatically generating a respective label for each respective one of the plurality of predefined clusters according to a plurality of thresholds for the plurality of features.

5. The method of claim 1, wherein determining the at least one entropy feature includes calculating a plurality of entropy features of a plurality of portions of the session and aggregating the plurality of entropy features as the at least one entropy feature.

6. The method of claim 1, further comprising:

training, by the at least one processor, the second clustering ML model using at least one of the plurality of features and the at least one entropy feature as training data; and configuring, by the at least one processor, the clustering ML model using the at least one entropy feature as a weighting factor.

7. A method comprising:

receiving, by at least one processor, network traffic data;

grouping, by the at least one processor, at least a portion of the network traffic data into at least one session according to time correlation of activity by a network entity;

extracting, by the at least one processor, a plurality of features indicative of malicious network activity from the at least one session;

classifying, by the at least one processor, the plurality of features with a clustering machine learning (ML) model including a plurality of predefined clusters each respectively indicating a respective one of a plurality of bot classifications, the classifying comprising initializing the clustering ML model with respective ones of the plurality of predefined clusters positioned according to respective locations of a plurality of thresholds for the plurality of features, the classifying indicating that the at least one session included activity corresponding to at least one of the plurality of bot classifications; and in response to the classifying, blocking, by the at least one processor, at least a portion of ongoing network traffic from the network entity from reaching at least one destination.

8. The method of claim 7, wherein the grouping includes:

selecting a subset of network traffic sent as requests by the network entity;

calculating time differences between consecutive requests;

determining at least one session start as a second one of a first pair of consecutive requests having a time difference above an idle time threshold;

determining at least one session end as a first one of a second pair of consecutive requests having a time difference above the idle time threshold; and forming the at least one session to include all requests by the network entity occurring after the first one of the first pair of consecutive requests and before the second one of the second pair of consecutive requests.

9. The method of claim 7, wherein extracting the plurality of features includes extracting at least one request-level feature, extracting at least one content-specific feature, extracting at least one time-related feature, or a combination thereof.

10. The method of claim 7, wherein extracting the plurality of features includes deriving at least one of the plurality of features from an aggregation of two or more of the plurality of features.

11. The method of claim 7, further comprising automatically defining, by the at least one processor, the plurality of predefined clusters.

12. The method of claim 11, wherein the automatically defining the plurality of predefined clusters comprises automatically generating a respective label for each respective one of the plurality of predefined clusters according to a plurality of thresholds for the plurality of features.

13. A method comprising:

receiving, by at least one processor, network traffic data;

grouping, by the at least one processor, at least a portion of the network traffic data into at least one session according to time correlation of activity by a network entity;

extracting, by the at least one processor, a plurality of features indicative of malicious network activity from the at least one session;

determining, by the at least one processor, at least one entropy feature of the at least one session, the determining comprising calculating a plurality of entropy features of a plurality of portions of the session and aggregating the plurality of entropy features as the at least one entropy feature;

classifying, by the at least one processor, the plurality of features and the at least one entropy feature with a clustering machine learning (ML) model, the classifying indicating that the at least one session included malicious activity; and in response to the classifying, blocking, by the at least one processor, at least a portion of ongoing network traffic from the network entity from reaching at least one destination.

14. The method of claim 13, wherein the grouping comprises:

selecting a subset of network traffic sent as requests by the network entity;

calculating time differences between consecutive requests;

determining at least one session start as a second one of a first pair of consecutive requests having a time difference above an idle time threshold;

determining at least one session end as a first one of a second pair of consecutive requests having a time difference above the idle time threshold; and forming the at least one session to include all requests by the network entity occurring after the first one of the first pair of consecutive requests and before the second one of the second pair of consecutive requests.

15. The method of claim 13, wherein extracting the plurality of features includes applying at least one regular expression to identify at least one of the plurality of features.

16. The method of claim 13, further comprising training, by the at least one processor, the clustering ML model using at least one of the plurality of features and the at least one entropy feature as training data.

17. The method of claim 13, further comprising configuring, by the at least one processor, the clustering ML model using the at least one entropy feature as a weighting factor.

* * * * *